E. H. BRISTOL & W. H. FITTS.
HYGROMETER AND OTHER INSTRUMENT.
APPLICATION FILED JAN. 18, 1913.
1,243,671. Patented Oct. 16, 1917.
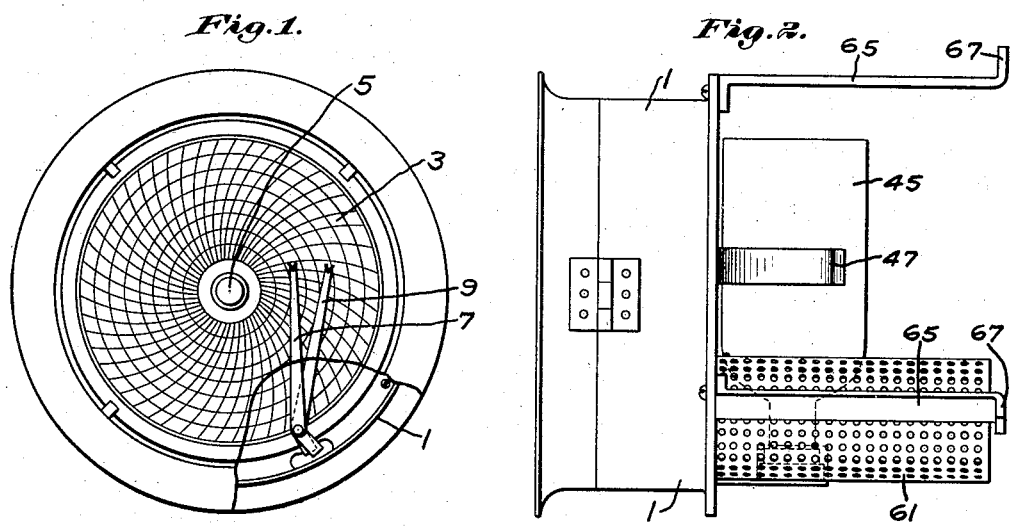
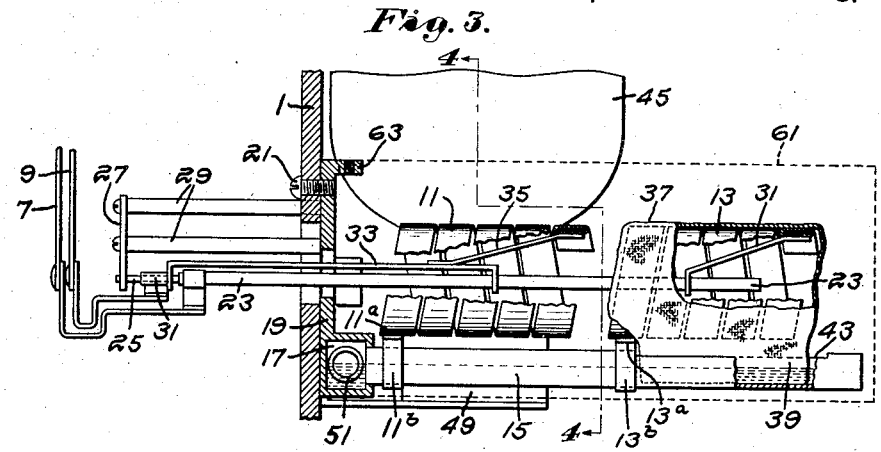
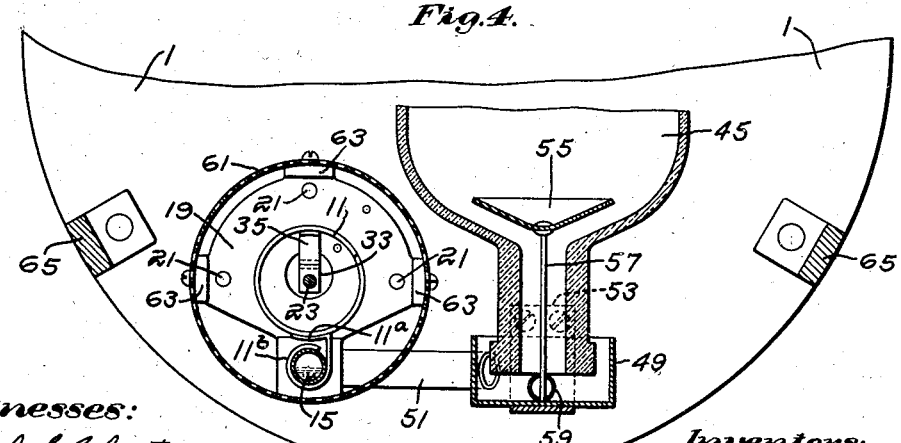
Witnesses:
Carl L. Choate.
Horace A. Grossman
Inventors:
Edgar H. Bristol,
Walter Henry Fitts,
by Emery, Booth, James & Varney
Attys.

UNITED STATES PATENT OFFICE.

EDGAR H. BRISTOL AND WALTER HENRY FITTS, OF FOXBORO, MASSACHUSETTS, ASSIGNORS TO THE INDUSTRIAL INSTRUMENT COMPANY, OF FOXBORO, MASSACHUSETTS, A CORPORATION OF CONNECTICUT.

HYGROMETER AND OTHER INSTRUMENT.

1,243,671.     Specification of Letters Patent.    Patented Oct. 16, 1917.

Application filed January 18, 1913. Serial No. 742,777.

*To all whom it may concern:*

Be it known that we, EDGAR H. BRISTOL and WALTER H. FITTS, citizens of the United States, and residents of Foxboro, in the county of Norfolk and Commonwealth of Massachusetts, have invented an Improvement in Hygrometers and other Instruments, of which the following description, in connection with the accompanying drawings, is a specification, like characters on the drawings representing like parts.

This invention relates to hygrometers and the like, and more particularly to hygrometers in which wet and dry thermometers are employed.

The character of the invention may be best understood by reference to the following description of an illustrative embodiment thereof shown in the accompanying drawing, wherein:

Figure 1 is a front elevation of an illustrative hygrometer embodying the invention;

Fig. 2 is a side elevation of Fig. 1;

Fig. 3, on an enlarged scale, is a sectional detail of parts of the mechanism; and Fig. 4 is a section taken on line 4—4 of Fig. 3.

Referring to the drawing, the illustrative instrument therein shown as embodying the invention comprises a casing 1 of any usual construction, within which there is mounted a chart 3 graduated radially to represent periods of time and circularly to represent a scale of temperature. This chart may be detachably secured to a spindle 5 driven by any suitable means, such for example as the time train of a clock mechanism.

A pair of indexes or pointers, in the illustrative embodiment, pen indexes 7 and 9, mounted and driven as hereinafter described, may be arranged to travel in a generally radial direction over the chart 3 in order to indicate or record thereon temperatures prevailing at or during any instant, or period of time.

For the purposes of the specific instrument, there are mounted, at the rear of the casing, temperature-responsive elements exemplified herein as helically coiled tubes 11 and 13 of flattened cross sectional shape. These tubes are filled with alcohol or other suitable liquid and then sealed. These tubes preferably are arranged in tandem and have ends 11ª and 13ª, respectively fixed by straps 11ᵇ and 13ᵇ to an elongated bracket pipe 15 paralleling said tubes, said straps being conveniently soldered to said helical tubes and to said bracket pipe. To secure the latter to the rear of the casing it may have an end threaded in a union 17, conveniently integral with a plate 19 held to the rear face of said casing by suitable screws 21.

The variations of temperature will cause the liquid in the tubes 11 and 13 to expand or contract and thereby produce in the tubes a rotary tendency about their axes, and the free ends of said tubes will thereby have a substantial circumferential movement.

To transmit the movement of the free end of the tube 13 to the index 7 the latter is secured to a shaft 23, having a reduced end 25 journaled in a bearing plate 27 mounted on posts 29 projecting through an aperture in the back plate of the casing to find support in the plate 19 referred to. The opposite end of said shaft 23 is connected to the movable portion of the helically coiled tube 13 by a suitable radially extensible, but preferably circumferentially rigid, driving connection, herein comprising a flat, ribbon-like arm 31 fixed at one end to the tube 13, and at its opposite end to the shaft 23 in any suitable manner, as by soldering, said arm extending from said tube obliquely to said shaft. By this construction the arm transmits without loss of motion the rotative movement of the tube to the shaft, and at the same time permits the coils of the tube to expand and contract more or less radially.

To transmit movement of the free end of the tube 11 to the index 9, the latter is provided with a boss 31 loose on the reduced end 25 of the shaft 23 and secured to one end of a U-shaped bar 33, paralleling the shaft 23 and having its ends apertured to receive said shaft. The bar 33 is connected to the movable end of the expansion tube 11 by a flat ribbon-like arm 35, somewhat similar to the arm 31 described for transmitting movement from the expansion tube 13 to the shaft 23.

The index boss 31 and the reduced end of the shaft 25 are so arranged that the boss and shaft may have more or less relative movement axially to allow for any movement of the tubes 11 and 13 axially of said shaft. The mounting of the shafts described supports the indexes so that they turn on a common axis, thereby permitting them to swing radially in superposed relation.

The above described connections from the tubes to the indexes provide a simple and effective mechanism for transmitting accurately the movements of the tubes to said indexes.

The tubes and the ribbon-like arms for transmitting movement from the tubes to the shaft are in some respects similar to that shown and claimed in the copending application of Edgar H. Bristol Serial No. 673,525 filed January 26, 1912.

To provide data for ascertaining the hygrometric conditions of the atmosphere the tube 11 is dry and responsive to natural changes in the temperature of the atmosphere surrounding the same, but the tube 13 should be maintained moist. To this end it is enveloped in a casing or wick 37 of silk or other suitable material having a portion 39 immersed in water, or other suitable liquid, for conducting the proper amount of moisture to the envelop proper and to the tube 13.

To feed liquid to the fabric envelop 37 the bracket pipe 15, referred to, is utilized and is provided with a longitudinally extending slot 43 through which the envelop portion 39 may be entered and be immersed in the liquid contained in said pipe.

An important feature of the invention relates to means for supplying and controlling the feeding of the liquid to said envelop. To this end there is provided a reservoir conveniently in the form of a bottle 45 removably supported between resilient arms 47 projecting rearwardly from the casing 1. The neck of the bottle may be introduced to and seated in a receiver or cup 49 communicating through a pipe 51 and the union with the envelop receiving pipe 15. To contribute to the support of said receiver it may be connected to the rear face of the casing 1 by a bracket 53.

The bottle 45 being closed, with the exception of the opening afforded by its neck, renders it necessary to remove the same from said receiver 49 to permit the filling thereof. To prevent escape of the water from the bottle when it is inverted for presentation to the receiver cup, suitable valve means is provided, herein typified as a conical valve 55 of rubber, or other suitable material, adapted to seat itself on the opening formed at the juncture of the neck with the body of the bottle. It will be apparent that, when the bottle is inverted with water in it, the pressure of the water will force the valve 55 toward and maintain the same on its seat.

When the bottle is introduced to the receiver 49 it is desirable to automatically open the valve to permit the feeding of the water from the bottle into the receiver. To this end the valve 55 is connected by a rod 57 with an operating member conveniently in the form of a short tube 59 extending transversely across the end of the neck of the bottle. By this construction, when said neck is introduced into the receiver the short tube 59 will rest against the bottom of the cup, and the rod 57, being longer than the neck of the bottle, when the neck of the bottle is moved down into contact with said short tube, will lift the valve 55 from its seat. The latter may conveniently constitute a rest for supporting the neck of the bottle a desired distance from the bottom of the cup to permit the flow of liquid from the bottle into said receiver.

When the bottle is positioned with its neck in the receiver, as described, the end of the neck will be sufficiently spaced from the bottom of the receiver to permit a supply of water to flow from the bottle into the receiver, thence into the pipe 51 and the tube 15. The water will flow from the bottle until it rises in the cup to the end of the bottle neck. On the occurrence of this event, the neck of the bottle is sealed and the flow from the bottle is arrested.

Preferably the neck of the bottle should be in such a position as to maintain the water at such a level as merely partially to fill the tube 15, in order that there may be no possibility of forcing the liquid too rapidly to the tube containing envelop or creating leakage through the tube slot 43.

After a time the charge of liquid in the tube 15 will be absorbed by the envelop sufficiently to cause the liquid level in the receiver 49 to drop beneath the end of the bottle neck. This will permit the ingress of air to said neck, and cause the feed of a fresh supply of water from the bottle sufficient to raise again the level of the water in the cup to the end of the neck, whereupon the neck is closed and the feed from the bottle is arrested.

By the above described construction the feed of the water from the bottle to the absorbent envelop is automatically controlled or regulated so that a desired and prolonged supply of water is had to the envelop.

To protect the expansion tubes and the mechanism associated therewith, there may be provided a housing 61, perforated to permit the free ingress of air to the tubes. This housing may be connected to the plate 19, referred to, by screws entered through apertures in said housing into feet 63 projecting from said plate.

To properly space the mechanism at the rear of the casing 1 from the wall supporting said casing, the latter may be provided with legs 65 extending rearwardly from said casing, and having feet 67 for receiving suitable screws for securing said legs to a wall or other place desired.

The tube 11 is responsive to the natural temperature of the atmosphere and the liquid therein expands or contracts according to temperature changes. These changes are indicated and recorded on the chart 3 by the index 9. The evaporation of the moisture from the envelop containing the tube 13 will cause the temperature of said tube to be less than that of the tube 11. As a result, the tube 13 will expand less than the tube 11. The index 7 will indicate and record this reduced temperature on the chart 3. These temperatures, and the differences between them, afford the data for determining the hygrometric conditions of the atmosphere, which may be ascertained by reference to empirical tables.

The dry and wet expansion tubes, constructed and arranged as described, and the connections therefrom to the indexes, provide a simple and effective mechanism for indicating and recording the temperature changes.

The reservoir is sufficiently large to contain a large supply of water, the feed of which is regulated and controlled so that the water is fed to the absorbent envelop as required.

While the water feed regulating device is described herein in connection with the supplying of water to the wet tube of a hygrometer, it will be understood that its field of use is not limited thereto, but that it may be applied for other purposes as desired. Also the mechanism for transmitting movements from the responsive members to the indexes may be applied to other instruments.

It is to be understood that the invention is not limited to the specific construction, organization and mode of operation above described; on the contrary, the invention may be variously embodied and the described features may be used in various combinations and sub-combinations.

What we claim as new and desire to secure by Letters Patent is:

1. An instrument of the class described comprising, in combination, indexes; helical tube responsive members arranged in tandem and having fixed and movable ends, shaft means for connecting said movable ends to said indexes respectively; absorbent material for one of said members; means to conduct moisture to said material; and a reservoir separate from said conducting means for supplying moisture thereto.

2. An instrument of the class described comprising, in combination, indicating means, helical tube responsive members for governing said indicating means, absorbent material for one of said members; a slotted container receiving a portion of said material; a reservoir having an outlet for communication with said container and valve means for said outlet having provision for automatically opening the latter on presentation of said reservoir to said container.

3. An instrument of the class described comprising, in combination, indicating means; helical tube responsive members for governing said indicating means; a slotted container; absorbent material for one of said members having a portion entered through and closing the slot in said container; and a closed reservoir having a single opening and separable from said container, said reservoir having provision for automatically supplying moisture to said container as rapidly as it is consumed by said material.

4. An instrument of the class described comprising, in combination, indicating means; responsive members; means to transmit movement from said responsive members to said indicating means; a container; absorbent material for one of said members and having a portion entered into said container; and a reservoir for separable association with said container and having provision for automatically supplying moisture to said container proportionately to the consumption thereof by said material.

5. An instrument of the class described comprising, in combination, indicating means; responsive members for governing the same; a container; absorbent material for one of said members; a reservoir for supplying moisture to said container and material; and shaft means for transmitting movement from said responsive members to said indicating means and partially supported by said members.

6. An instrument of the class described comprising, in combination, indexes; helical tube responsive members for governing said indexes respectively; a fixed bearing; shaft means journaled therein; means connecting said members to said shaft means and having provision for contributing to the support of the latter; and means connecting said shaft means with said indexes respectively.

7. An instrument of the class described comprising, in combination, indexes; helical tube responsive members arranged in tandem for governing said indexes respectively; a container; absorbent material for one of said members having a portion inserted in said container; a housing for said members and container; and a reservoir for supplying moisture to the latter.

8. A hygrometer comprising in combination, indexes, temperature responsive members, means for transmitting movement from said members to said indexes respectively; a container, a wick extending from said container to one of said members and a reservoir detachably associated with said container for supplying water thereto.

9. A hygrometer comprising in combination, a casing, a dial plate therein, index means movable relatively to said plate, wet and dry temperature responsive members, means for transmitting movements from said members to said index means; a wick for said wet member, a container receiving said wick, a reservoir for supplying water to said container and means for automatically maintaining a predetermined level of water in said container.

10. A hygrometer comprising in combination, a dial, indexes movable over said dial to give readings similarly coördinated to a common origin, wet and dry temperature responsive coils arranged in tandem and substantially axial shaft members rotatable by said coils and arranged to transmit said rotary movement to the indexes respectively.

In testimony whereof, we have signed our names to this specification, in the presence of two subscribing witnesses.

EDGAR H. BRISTOL.
WALTER HENRY FITTS.

Witnesses:
BESSIE EVA JONES,
BERTHA MAY STEARNS.

---

Correction in Letters Patent No. 1,243,671.

It is hereby certified that Letters Patent No. 1,243,671, granted October 16, 1917, upon the application of Edgar H. Bristol and Walter Henry Fitts, of Foxboro, Massachusetts, for an improvement in "Hygrometers and Other Instruments," were erroneously issued to The Industrial Instrument Company, of Foxboro, Massachusetts, a corporation of Connecticut, whereas said Letters Patent should have been issued to The Foxboro Company, of Foxboro, Massachusetts, a corporation of Massachusetts, said corporation being owner, by mesne assignments, of the entire interest in said invention as shown by the records of assignments in this office; and that the said Letters Patent should be read with this correction therein that the same may conform to the record of the case in the Patent Office.

Signed and sealed this 20th day of November A. D., 1917.

[SEAL.]

R. F. WHITEHEAD,
Acting Commissioner of Patents.

Cl. 73—24.